United States Patent
Sehgal et al.

[11] Patent Number: 6,000,747
[45] Date of Patent: Dec. 14, 1999

[54] VEHICLE LIFTGATE AND FLIPGLASS WITH A SHARED HINGE AXIS

[75] Inventors: Rakesh Sehgal, Troy; Phillip Joseph Linson, Commerce Township; David William Hinze, St. Clair Shores; Clarke Michael Cunningham, Dearborn, all of Mich.

[73] Assignee: Ford Global Technologies, Inc., Dearborn, Mich.

[21] Appl. No.: 09/131,518

[22] Filed: Aug. 10, 1998

[51] Int. Cl.$^6$ ........................................................ B60J 5/02
[52] U.S. Cl. .................... 296/146.8; 296/146.11; 296/146.12; 296/76; 296/56
[58] Field of Search ......................... 296/146.11, 146.12, 296/146.8, 76, 56, 146.1, 146.2

[56] References Cited

U.S. PATENT DOCUMENTS

| | | | |
|---|---|---|---|
| 3,716,945 | 2/1973 | Cooper et al. | 296/56 |
| 4,294,039 | 10/1981 | Dalheimer et al. | 296/76 |
| 4,413,854 | 11/1983 | Hirshberg. | |
| 4,664,437 | 5/1987 | Queveau. | |
| 4,684,167 | 8/1987 | Newmayer | 296/146.11 |
| 4,688,844 | 8/1987 | Hirose et al. | 296/76 |
| 5,069,499 | 12/1991 | Burst et al. | 296/146.8 |
| 5,072,984 | 12/1991 | Jackson | 296/56 |
| 5,524,954 | 6/1996 | Gold. | |
| 5,876,086 | 3/1999 | Lagrou et al. | 296/146.11 |

FOREIGN PATENT DOCUMENTS

| | | | |
|---|---|---|---|
| 000618129A1 | 10/1994 | European Pat. Off. | 296/146.8 |
| 2581000 | 10/1986 | France | 296/76 |
| 002690405A1 | 10/1993 | France | 296/146.8 |
| 3315129 | 10/1984 | Germany | 296/76 |
| 0146420 | 11/1981 | Japan. | |
| 360261727 | 12/1985 | Japan | 296/146.8 |
| 360261728A | 12/1985 | Japan | 296/146.8 |
| 0074724 | 4/1988 | Japan | 296/76 |
| 402141328A | 5/1990 | Japan | 296/146.8 |

*Primary Examiner*—Joseph D. Pape
*Assistant Examiner*—Kiran Patel
*Attorney, Agent, or Firm*—Joseph W. Malleck

[57] ABSTRACT

A door assembly for a vehicle includes a door subassembly hinged to the vehicle having a window opening and a window subassembly hinged to the vehicle adapted to cover the window opening; the door subassembly and window subassembly having a common hinge axis and the door assembly operable between a closed position, a window subassembly open and door subassembly closed position, and a window subassembly and door subassembly open position.

15 Claims, 3 Drawing Sheets

6,000,747

VEHICLE LIFTGATE AND FLIPGLASS WITH A SHARED HINGE AXIS

FIELD OF THE INVENTION

The present invention relates to vehicle liftgates with a flipglass feature in general, and more specifically to a liftgate and flipglass with a shared hinge axis.

BACKGROUND OF THE INVENTION

Presently, vehicles built off of truck platforms, where the truck bed is enclosed and in communication with the passenger compartment, enjoy an increasing popularity. This type of vehicle, typically referred to as a sport utility vehicle, has a rear door commonly known as a "liftgate" articulated around a horizontal shaft at the top rear of the vehicle. The liftgate provides a means to access the rear storage area of the vehicle. A rear window or "flipglass" is a common feature of the liftgate and provides access to the rear storage area without having to raise the liftgate. The liftgate flipglass is mounted to the liftgate and articulated around a pair of externally visible hinges.

The flipglass hinges are undesirable for two reasons. First, from a vehicle styling standpoint, the hinges are considered aesthetically unappealing and a styling limitation due to their external placement. Second, from a manufacturing standpoint, there is a set of hinges for the liftgate and a separate set of hinges for the liftgate flipglass. Such redundancy increases overall vehicle cost and complexity.

One design for a hatchback-type rear door provides a pivotable door subassembly that has an independently pivoting window subassembly that either remains in place when the door is opened or may be opened in unison with the door. Although the door and window subassemblies share a common pivot hinge axis, thereby reducing overall vehicle cost and complexity, such an embodiment would be undesirable for a sport utility vehicle. More specifically, the access to the rear storage area would require lifting the tailgate and either leaving the glass in place or lifting the glass with the tailgate. Either mode of access would require raising the liftgate, which would defeat the purpose for having a flipglass feature. The purpose being that raising the liftgate to gain access to the rear storage area may be bypassed by utilizing the flipglass feature. Such a feature is desired when placing a small load in the rear storage area for example.

What is desired than is a rear door assembly having a liftgate with a liftgate flipglass feature having a common hinge axis therebetween, which allows the flipglass to be opened while the liftgate remains in place or allows both liftgate and flipglass to be opened. Such a door assembly would provide access to the rear storage area while improving vehicle styling flexibility and reducing overall vehicle cost and complexity by eliminating the independent flipglass hinges.

SUMMARY OF THE INVENTION

The present invention overcomes the disadvantages of the related art by providing a door assembly for a vehicle including a door subassembly hinged to the vehicle having a window opening and a window subassembly hinged to the vehicle and adapted to cover the window opening; the door subassembly and window subassembly having a common hinge axis and the door assembly operable between a closed position, a window subassembly open and door subassembly closed position, and a window subassembly and door subassembly open position.

An object of the present invention is to provide a vehicle door assembly that provides access to the rear storage area while improving vehicle styling flexibility and reducing overall vehicle cost and complexity by eliminating the exterior flipglass hinges.

An advantage of the present invention is that the liftgate and the liftgate flipglass have a common internal hinge axis, thereby eliminating the aesthetically undesirable external flipglass hinges and reducing overall vehicle cost by providing a single hinge mechanism for both the liftgate and flipglass.

BRIEF DESCRIPTION OF THE DRAWINGS

Other features and advantages of the present invention will become apparent to those skilled in the related arts upon reading the following description with reference to the accompanying drawings, in which.

DETAILED DESCRIPTION OF THE PREFERRED EMBODIMENT

Figure 1:
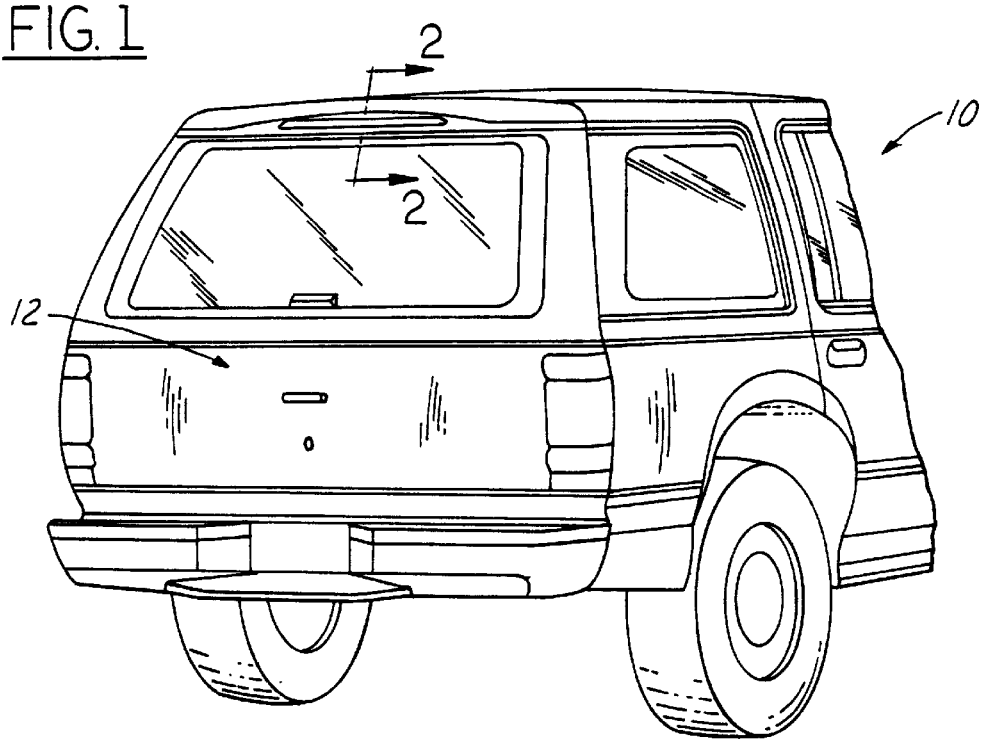
FIG. 1 is a perspective rear view of an automotive vehicle having a rear door assembly according to the present invention.
Figure 2:
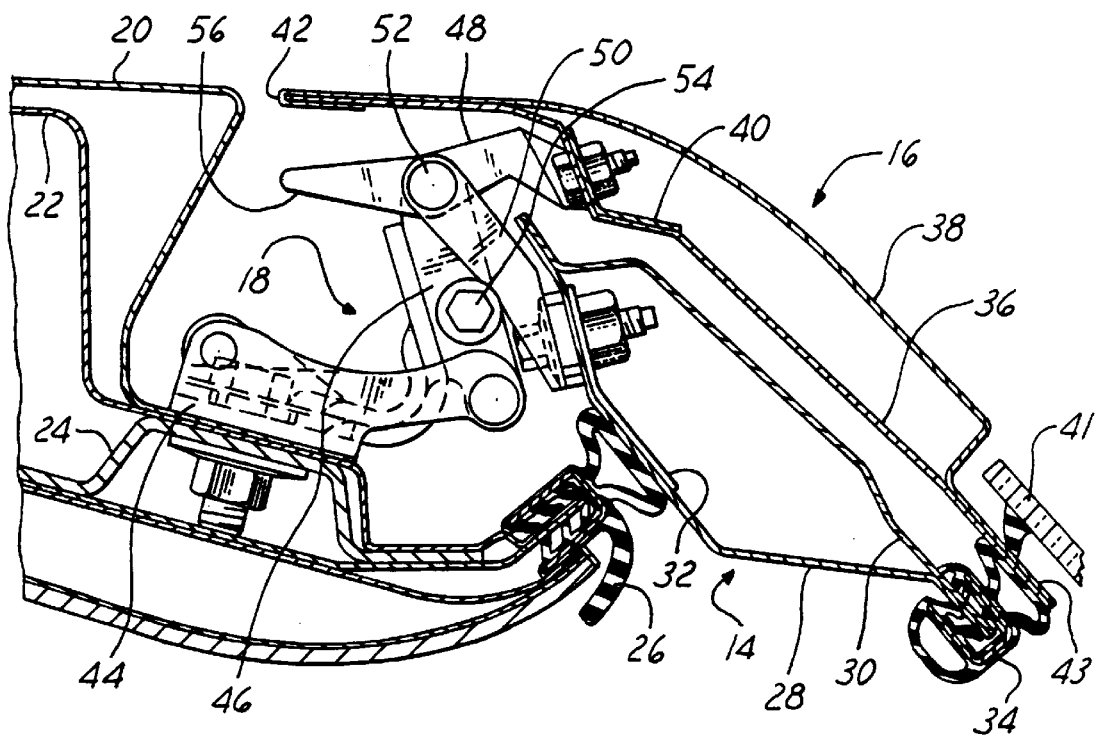
FIG. 2 is a sectional view taken along the line 2—2 of FIG. 1 showing a vehicle rear door assembly in a closed position according to the present invention.

Turning now to the drawings, and in particular to FIG. 1 thereof, a vehicle 10 is shown having a rear door assembly 12. As shown in FIG. 2, the gear door assembly 12 has an inner door subassembly 14, an outer window subassembly 16, and a unitary hinge mechanism 18 mounting the door and window subassemblies, 14 and 16 respectively, to the vehicle 10. The combination of door subassembly 14 and an outer window subassembly 16 to create a rear door assembly 12 for a sport utility vehicle is referred to as a liftgate with a liftgate flipglass feature.

The vehicle 10 of FIG. 2 has a roof panel 20, a rear header 22, and a hinge mechanism reinforcement 24. A portion of the rear header 22 is adapted to receive a door subassembly seal 26 that is adapted to engage the inner door subassembly 14 to hermetically seal the vehicle passenger compartment thereby. The roof panel 20 and rear header 22 are supported by the hinge mechanism reinforcement 24 in order to have the hinge mechanism 18 rigidly mounted thereto.

As further shown in FIG. 2, the door subassembly 14 is formed by inner and outer panels, 28 and 30 respectively. The door subassembly 14 has a door mount reinforcement 32 adjacent the inner panel 28. A portion of the inner door subassembly 14 is adapted to receive a window subassembly seal 34 (defining a window opening), which hermetically seals the outer door subassembly 14 with respect to the outer window subassembly 16 to close the window opening.

As also shown in FIG. 2, the outer window subassembly 16 is formed by inner and outer panels, 36 and 38 respectively which are superimposed over the door subassembly. The outer window subassembly 16 has a window mount reinforcement 40 adjacent the inner panel 36. The outer window subassembly has a leading edge 42 proximate the rearward most portion of the roof panel 20 that functions to shield the hinge mechanism 18 from environmental exposure. A glass window pane 41 is attached in conventional fashion to a window frame 43 formed by the outer window subassembly 16.

The hinge mechanism 18 of FIG. 2 has a base plate 44, a link 46, a window mount arm 48, a door mount arm 50, and a hinge pivot shaft 52. The base plate 44 is rigidly attached to the vehicle 10 by sandwiching the roof panel 20, rear header 22 and hinge reinforcement 24 together with a conventional fastener such as a nut and bolt. The link 46, projecting from the base plate 44, has a link mechanical stop 54 projecting therefrom and the hinge pivot shaft 52 running therethrough. The window mount arm 48 and door mount arm 50 are independently, pivotally attached to the hinge pivot shaft 52 and have a shared hinge pivot axis thereby. The hinge pivot shaft 52 is situated substantially horizontal and transverse to the vehicle 10 and is located at the top rear thereof. The door mount arm 50 is rigidly attached to the door subassembly 14 by sandwiching the door inner panel 28 and the door mount reinforcement 32 together with a conventional fastener. The door mount arm 50 abuts against the link mechanical stop 54 when the door subassembly 14 is in a closed position. The window mount arm 48 is rigidly attached to the window subassembly 14 by sandwiching the window inner panel 36 and the window mount reinforcement 40 together with a conventional fastener. The window mount arm 48 has a stop surface 56 adapted to engage the link mechanical stop 54 of the link 46 upon rotation of the window subassembly 16 about the hinge pivot shaft 52, via the window mount arm 48, and limit pivotal rotation thereby.

Figure 3:
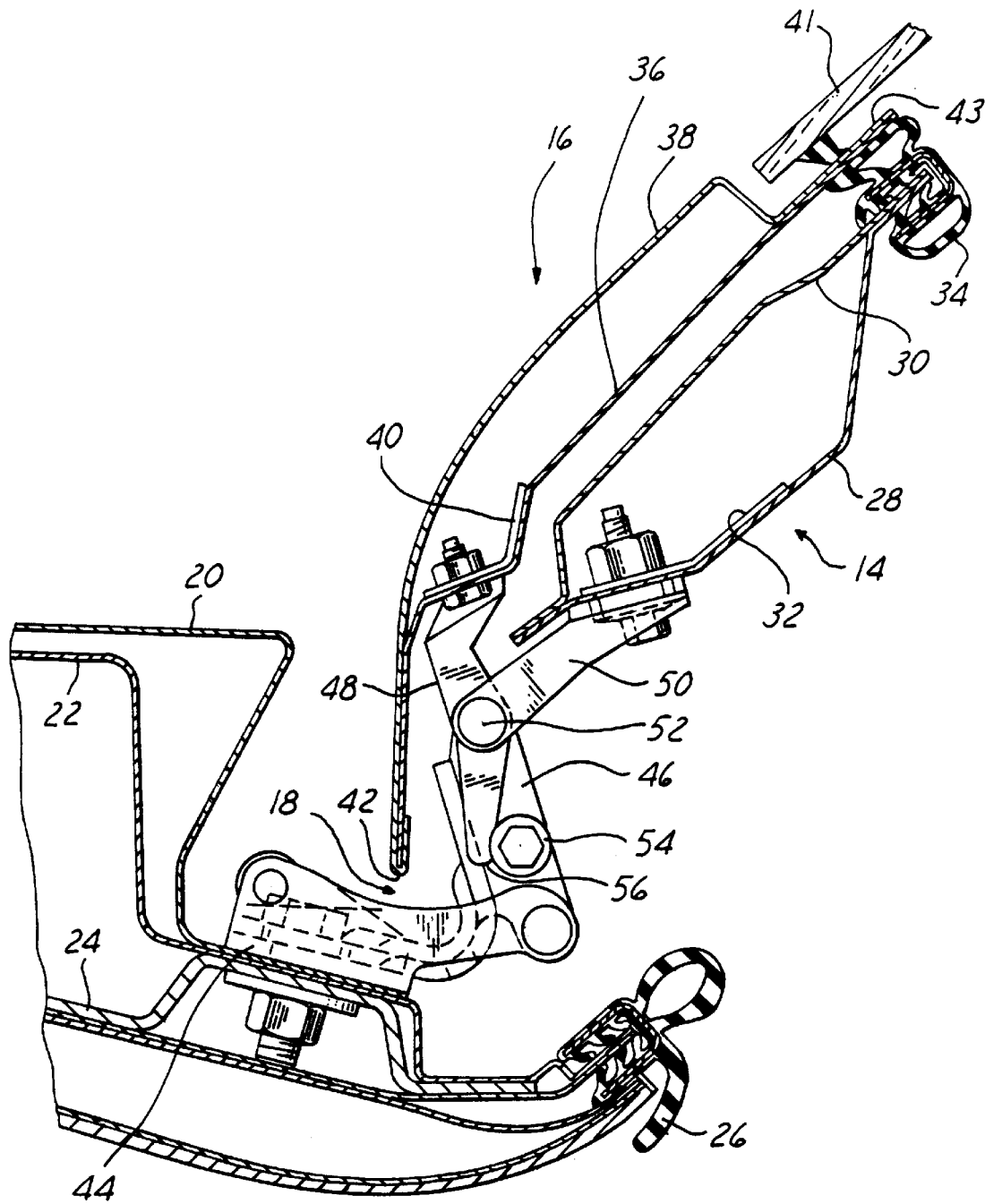
FIG. 3 is a sectional view taken along the line 2—2 of FIG. 1 showing a vehicle rear door assembly in an open position according to the present invention.
Figure 4:
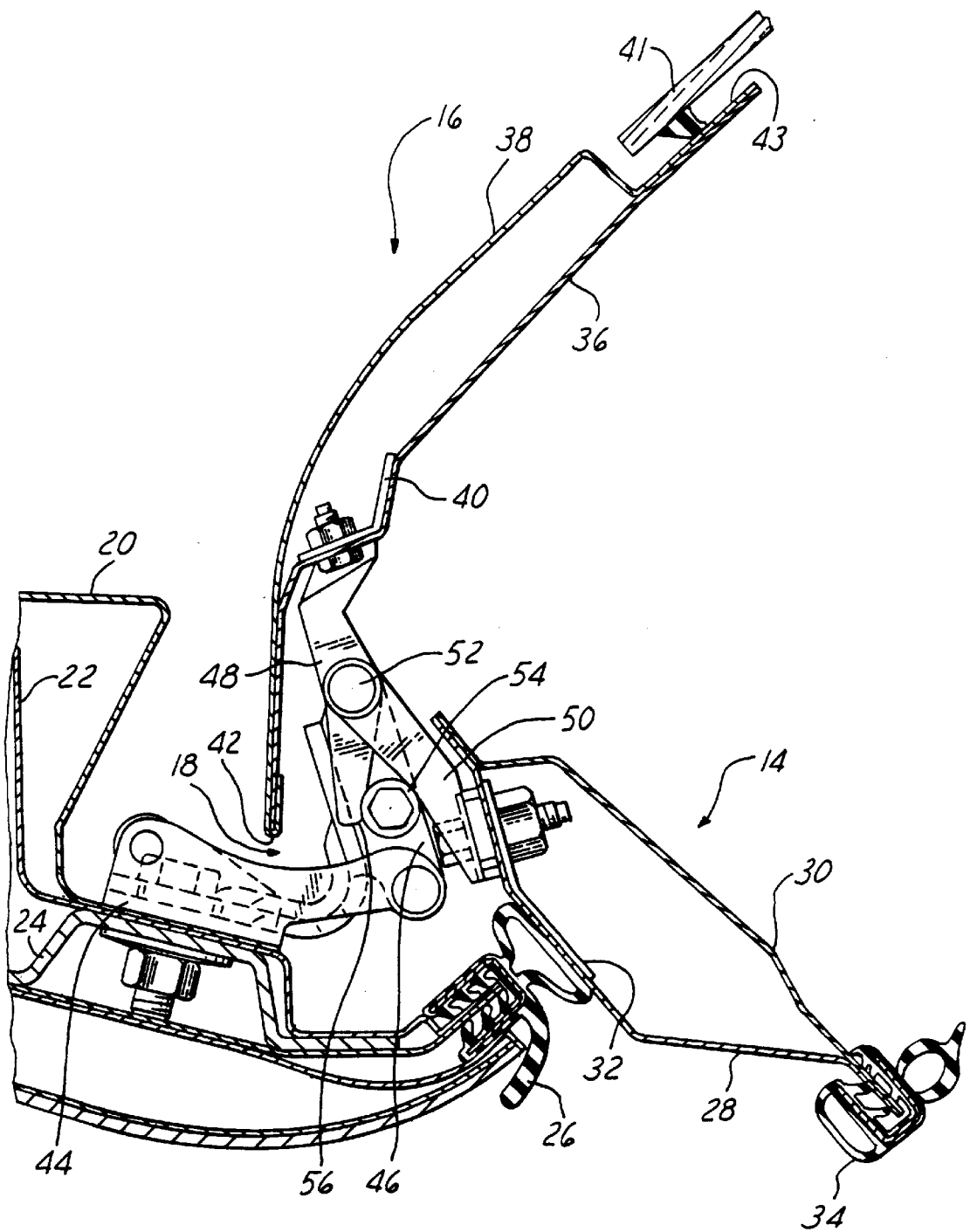
FIG. 4 is a sectional view taken along the line 2—2 of FIG. 1 showing a vehicle rear door assembly in a window subassembly open and door subassembly closed position according to the present invention.

As shown in FIG. 2, the door assembly is in a closed position. More specifically, the door subassembly 14 is in contact with the door subassembly seal 26 and the door mount arm 50 is in contact with the link mechanical stop 54. Furthermore, the outer window subassembly 16 is in contact with the window subassembly seal 34 and the leading edge 42 is substantially flush with the roof panel 20. As shown in FIG. 3, the door assembly is operable to a inner door and outer window subassembly, 14 and 16 respectively, open position. More specifically, the outer window subassembly 16 is rotated until the stop surface 56 engages the link stop mechanism 54. Furthermore, the outer window subassembly seal 34 is maintained in contacting relationship with the outer window subassembly 16 keeping the window opening closed and, sustaining the outer window subassembly 16 in substantially parallel relationship with respect to the door subassembly 14 thereby. As shown in FIG. 4, the door assembly is operable to an outer window subassembly 16 open and inner door subassembly 14 closed position. More specifically, the outer window subassembly 16 is rotated until the stop surface 56 engages the link stop mechanism 54. Furthermore, the inner door subassembly 14 is in contact with the door subassembly seal 26.

The present invention advantageously has a common internal hinge axis for both the inner door subassembly 14 and outer window subassembly 16. More specifically, the common hinge axis eliminates the aesthetically undesirable external window subassembly 16 hinges and reduces overall vehicle cost by providing a unitary hinge mechanism 18 for both the door and window subassemblies, 14 and 16 respectively.

Only one embodiment of the rear door assembly of the present invention has been described. Those skilled in the automotive arts will appreciate that others may be possible without departing from the scope of the following claims.

We claim:

1. A door assembly for a vehicle comprising:
  a door subassembly hinged to the vehicle having a window opening;
  a window subassembly hinged to the vehicle and superimposed over said door subassembly while adapted to cover the window opening; and
  wherein the door subassembly and window subassembly have a common hinge, the door assembly being operable between a closed position for both the door subassembly and window subassembly, a window subassembly open and door subassembly closed position, and a window subassembly and door subassembly open position.

2. A door assembly according to claim 1 wherein the door assembly is adapted to be mounted to the vehicle as a rear liftgate door with the hinge having an axis substantially horizontal and transverse to the vehicle at the top rear thereof but covered by said outer window subassembly.

3. A door assembly according to claim 1 wherein the window subassembly hinge has a stop adapted to limit opening rotational travel of the window subassembly thereby.

4. A door assembly according to claim 1 wherein a seal is disposed on the inner door assembly to act between the inner door subassembly and outer window subassembly.

5. A door assembly according to claim 1 wherein a seal is mounted on the vehicle body to sealingly act between the door subassembly and the vehicle body.

6. A door assembly for a vehicle comprising:
  an inner door subassembly hinged to the vehicle having a window opening and operable between a door closed and door opened position;
  an outer window subassembly hinged to the vehicle so as to cover the window opening and being operable between a window open and a window closed position; and
  wherein the door subassembly and window subassembly have a common hinge allowing the outer window subassembly to be moved to a position uncovering said window opening while the inner door subassembly remains closed.

7. A door assembly according to claim 6 wherein the door assembly is adapted to be mounted to the vehicle as a rear liftgate door with the hinge axis substantially horizontal and transverse to the vehicle at the top rear thereof.

8. A door assembly according to claim 6 wherein the window subassembly hinge has a stop adapted to limit opening rotational travel of the window subassembly thereby.

9. A door assembly according to claim 6 wherein a seal is disposed intermediate the door subassembly and window subassembly.

10. A door assembly according to claim 6 wherein a seal is disposed between the door subassembly and the vehicle body.

11. A door assembly for a vehicle comprising:
  an inner door subassembly hinged to the vehicle having a window opening;
  an outer window subassembly hinged to the vehicle and adapted to cover the window opening; and
  wherein the door subassembly and window subassembly have a common hinge allowing, the door assembly to be operable between a closed position, a window subassembly open and door subassembly closed position, and a window subassembly and door subassembly open position.

12. A door assembly according to claim 11 wherein the door assembly is adapted to be mounted to the vehicle as a rear liftgate door with the hinge axis substantially horizontal and transverse to the vehicle at the top rear thereof.

13. A door assembly according to claim 11 wherein the window subassembly hinge has a stop adapted to limit rotational travel of the window subassembly thereby.

14. A door assembly according to claim 11 wherein a seal is disposed intermediate the door subassembly and window subassembly.

15. A door assembly according to claim 11 wherein a seal is disposed between the door subassembly and the vehicle body.

* * * * *